(12) United States Patent
Repentin

(10) Patent No.: US 11,277,044 B2
(45) Date of Patent: Mar. 15, 2022

(54) COMPRESSOR

(71) Applicant: BITZER Kuehlmaschinenbau GmbH, Sindelfingen (DE)

(72) Inventor: Franck Repentin, Herrenberg (DE)

(73) Assignee: BITZER Kuehlmaschinenbau GmbH, Sindelfingen (DE)

( * ) Notice: Subject to any disclaimer, the term of this patent is extended or adjusted under 35 U.S.C. 154(b) by 0 days.

(21) Appl. No.: 15/902,374

(22) Filed: Feb. 22, 2018

(65) Prior Publication Data

US 2018/0183281 A1 Jun. 28, 2018

Related U.S. Application Data

(63) Continuation of application No. PCT/EP2015/069703, filed on Aug. 27, 2015.

(51) Int. Cl.
*H02K 1/20* (2006.01)
*H02K 9/14* (2006.01)
(Continued)

(52) U.S. Cl.
CPC ............... *H02K 1/185* (2013.01); *H02K 9/14* (2013.01)

(58) Field of Classification Search
CPC ............ H02K 1/20; H02K 1/187; H02K 9/14; H02K 1/185; H02K 1/12; H02K 1/16;
(Continued)

(56) References Cited

U.S. PATENT DOCUMENTS 1,870,237 A 3/1930 Chervenka
1,822,096 A * 9/1931 Hollander ............... H02K 1/185
310/427

(Continued)

FOREIGN PATENT DOCUMENTS

EP 1 065 376 A2 1/2001
EP 1 139 542 A2 10/2001
(Continued)

*Primary Examiner* — Burton S Mullins
(74) *Attorney, Agent, or Firm* — Reinhart Boerner Van Deuren P.C.

(57) ABSTRACT

The invention relates to a compressor for refrigerant having a compressor housing, said compressor housing being provided with a suction inlet and a pressure outlet, said compressor comprising a compression unit, arranged in a compression housing section of said compressor housing and an electric motor arranged in a motor housing section of said compressor housing, said electric motor comprising a stator arranged within a stator receiving sleeve of said motor housing section and a rotor surrounded by said stator and arranged on a drive shaft of said electric motor for rotation about an axis of rotation together with said drive shaft, said stator comprising a stator core having a stack of laminations and extending parallel to said axis of rotation from a first front side to a second front side, said stator having windings extending through said stator core and forming end windings arranged in front of said front surfaces, and a channel for guiding at least a portion of said refrigerant entering through said suction inlet along an outer side of said stator before entering said compression unit.

13 Claims, 10 Drawing Sheets

(51) Int. Cl.
  *H02K 1/12* (2006.01)
  *H02K 1/18* (2006.01)

(58) Field of Classification Search
  CPC .. H02K 1/17; H02K 3/00; H02K 3/12; H02K 3/46; H02K 3/48; H02K 3/521; H02K 3/522; F04C 29/045; F04C 15/0096
  USPC ............... 310/54, 89; 417/423.8, 423.14
  See application file for complete search history.

(56) References Cited

U.S. PATENT DOCUMENTS

| | | | | |
|---|---|---|---|---|
| 3,916,231 | A * | 10/1975 | Cathey | H02K 15/125 |
| | | | | 310/62 |
| 4,012,653 | A * | 3/1977 | Shigeta | H02K 1/16 |
| | | | | 310/432 |
| 4,537,046 | A * | 8/1985 | Fujiyama | F04B 39/06 |
| | | | | 310/211 |
| 4,903,497 | A * | 2/1990 | Zimmern | F04C 29/045 |
| | | | | 62/113 |
| 5,246,349 | A * | 9/1993 | Hartog | F04C 29/0085 |
| | | | | 417/371 |
| 5,331,238 | A | 7/1994 | Johnsen | |
| 6,045,344 | A * | 4/2000 | Tsuboi | F04C 29/026 |
| | | | | 418/100 |
| 6,234,768 | B1 * | 5/2001 | Harakawa | B60H 1/3223 |
| | | | | 417/366 |
| 6,533,558 | B1 * | 3/2003 | Matsumoto | F04C 18/3442 |
| | | | | 417/368 |
| 6,544,009 | B2 * | 4/2003 | Makino | H02K 1/185 |
| | | | | 310/216.003 |
| 6,623,253 | B1 * | 9/2003 | Onoda | F04C 23/008 |
| | | | | 417/366 |
| 6,652,250 | B2 * | 11/2003 | Yoshimura | F01C 21/02 |
| | | | | 417/357 |
| 6,680,550 | B2 * | 1/2004 | Matsunaga | H02K 1/20 |
| | | | | 310/52 |
| 6,836,051 | B2 * | 12/2004 | Hiwaki | H02K 1/185 |
| | | | | 310/254.1 |
| 7,044,719 | B2 * | 5/2006 | Yanagisawa | F04C 23/008 |
| | | | | 417/410.5 |
| 7,164,218 | B2 * | 1/2007 | Kimura | F04C 23/008 |
| | | | | 310/216.044 |
| 7,538,468 | B2 * | 5/2009 | Kobayashi | H02K 1/185 |
| | | | | 310/216.049 |
| 7,767,105 | B2 * | 8/2010 | Uetsuji | H02K 1/187 |
| | | | | 216/58 |
| 7,938,633 | B2 * | 5/2011 | Iguchi | F01C 21/10 |
| | | | | 310/216.049 |
| 9,729,018 | B2 * | 8/2017 | Koenig | H02K 1/20 |
| 10,260,503 | B2 * | 4/2019 | Onara | F04C 29/0085 |
| 2003/0102729 | A1 * | 6/2003 | Sanuki | H02K 5/20 |
| | | | | 310/58 |
| 2007/0210669 | A1 * | 9/2007 | Fukasaku | H02K 1/185 |
| | | | | 310/216.023 |
| 2008/0038127 | A1 * | 2/2008 | Yonemoto | F04C 18/16 |
| | | | | 417/423.8 |
| 2011/0037353 | A1 * | 2/2011 | Rantapaa | H02K 5/20 |
| | | | | 310/60 A |
| 2014/0292122 | A1 | 10/2014 | Pal | |
| 2016/0312782 | A1 * | 10/2016 | Shoulders | F04B 39/02 |

FOREIGN PATENT DOCUMENTS

EP          1384893 B1    11/2018
WO    WO 2009/127781 A1    10/2009

\* cited by examiner

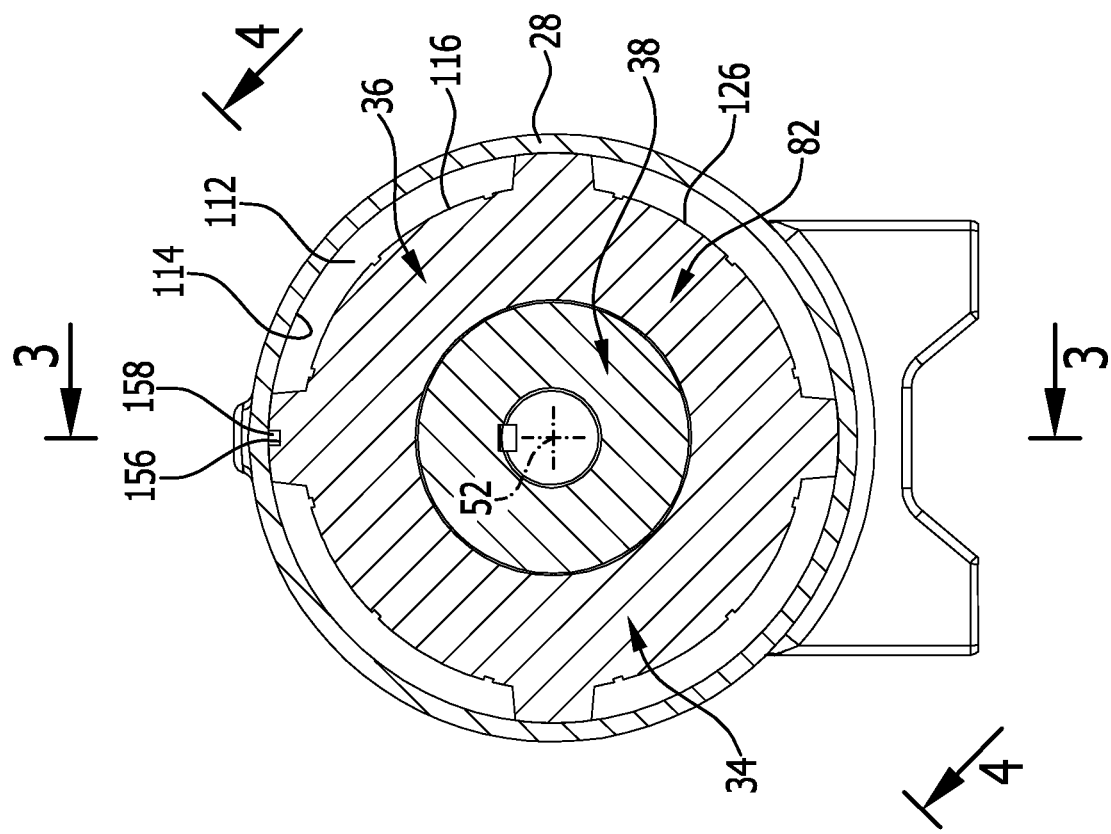
FIG.2
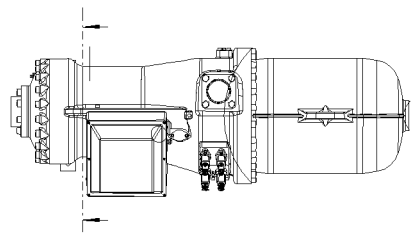

COMPRESSOR

CROSS-REFERENCE TO RELATED PATENT APPLICATION

This application is a continuation of International application number PCT/EP2015/069703 filed on Aug. 27, 2015.

This patent application claims the benefit of International application No. PCT/EP2015/069703 of Aug. 27, 2015, the teachings and disclosure of which are hereby incorporated in their entirety by reference thereto.

BACKGROUND OF THE INVENTION

The invention relates to a compressor for refrigerant having a compressor housing, said compressor housing being provided with a suction inlet and a pressure outlet, said compressor comprising a compression unit, arranged in a compression housing section of said compressor housing and an electric motor arranged in a motor housing section of said compressor housing, said electric motor comprising a stator arranged within a stator receiving sleeve of said motor housing section and a rotor surrounded by said stator and arranged on a drive shaft of said electric motor for rotation about an axis of rotation together with said drive shaft, said stator comprising a stator core having a stack of laminations and extending parallel to said axis of rotation from a first front side to a second front side, said stator having windings extending through said stator core and forming end windings arranged in front of said front surfaces, and a channel for guiding at least a portion of said refrigerant entering through said suction inlet along an outer side of said stator before entering said compression unit.

A channel for guiding at least a portion of refrigerant can be any path through which refrigerant can flow in a certain direction of flow irrespective of any existing or non-existing limitation in direction transverse to said direction of flow.

Such compressors are known from the prior art. According to said known concepts the stator receiving sleeve is provided with stator support elements whereas the stator core is usually provided with a cylindrical outer surface abutting on said stator support elements of said stator receiving sleeve.

These known concepts require complicated machining processes and have further restrictions with respect to the assembly of the electric motor in the housing.

In particular in the known concepts it is necessary to have an outer diameter of the end windings to be reduced with respect to an outer diameter of the stator core in order to avoid collision with said stator support elements during assembly.

It is therefore the object of the present invention to improve a compressor according to the aforementioned features in order to simplify the machining and assembly thereof.

SUMMARY OF THE INVENTION

This object is solved by a compressor as mentioned before having the stator core provided with at least two stator support elements fixed to said stator core and extending in radial direction of said axis of rotation beyond an outer surface of said stator core for support of said stator on an inner sleeve surface of said stator receiving sleeve.

The advantage of the inventive solution has to be seen in the fact that having the stator support elements arranged on the stator core machining of the inner sleeve surface of said housing sleeve is simplified whereas the provision of said stator support elements on said stator core enables use of simplified manufacturing processes.

In addition the fact that the stator support elements are fixed to said stator core enables an improved cooling of said stator core by said flow of refrigerant through said flow guiding channels extending along said stator support elements of said electric motor.

The inventive concept allows to increase the flow cross section without increasing the outer diameter or length of the housing sleeve or to decrease the outer diameter or length of the housing sleeve by maintaining the flow cross section.

It is of particular advantage if said outer side of said stator is provided by outer surfaces of said end winding of said stator and an outer surface of said stator core extending between said end winding of said stator.

Further the outer surfaces of said end windings could be arranged at a smaller radial distance from said axis of rotation than said outer surface of said stator core.

It is of particular advantage if the outer surface of said winding ends is arranged more or less flush with said outer surface of said stator core.

In this connection more or less flush means that the radial distance from said axis of rotation of said outer surface of said end windings is equal to said radial distance of said outer surface of said stator core or greater than 95% of said radial distance of said outer surface of said stator core.

It is of particular advantage if said radial distance from said axis of rotation of said outer surfaces of said end windings is greater than 98% of said radial distance of said outer surface of said stator core.

However it is of advantage if said outer surface of said stator core is flush with said outer surfaces of that winding ends in order to obtain an undisturbed flow of refrigerant and therefore increase efficiency of cooling-off said outer surfaces of said winding ends.

Having the outer surface of said winding ends flush with said outer surface of said stator core enables an increase of said inner surfaces of said end windings which provides more space for the arrangement of a bearing system together with a bearing sleeve as close as possible to said rotor.

Such a design enables to reduce the length of the motor and/or the load on the bearing system due to the arrangement of the stator closer to the bearing system.

With respect to the design of said stator support elements no further details have been given till now.

It is of particular advantage if said stator support elements are provided with radially outer support surfaces abutting on said inner sleeve surface of said housing sleeve.

It is of particular advantage if said outer support surfaces of said stator support elements are abutting on said inner sleeve surface by forming a friction fit or even a press fit.

One preferred solution provides that said stator support elements are formed by protrusions of laminations of said stator core extending beyond said outer surface of said stator core.

In this case the protrusions are preferably manufactured as being integral or one piece with said laminations forming said core and stacking the laminations provided with protrusions leads to forming of said stator support elements.

In principle a simple design provides the said stator support elements extend from one front side of said stator core to the other front side, in particular in a direction parallel to said axis of rotation.

However it is possible to provide stator support elements having a reduced extension parallel to said axis of rotation, for example by only providing part of said laminations forming said stator core with protrusions forming said stator support elements.

For example it would be possible to form said stator support elements by some protrusions of laminations adjoining a front side which are then followed by laminations without protrusions and thereafter followed by laminations having again protrusions, in particular the laminations adjoining the other front side.

Further a preferred and simplified solution provides stator support elements extending only parallel to said axis of rotation.

However the stator support elements could also be designed as curved stator support elements, extending with one component in direction of said axis of rotation but also with another component with an increasing angle of rotation about said axis of rotation so that for example the stator support elements can have a shape like a pitch of a screw.

Another advantageous solution provides that said stator support elements are fixed onto said stator core as being separate elements.

In this case the stator core is formed by laminations having an outer contour which for example is basically cylindrical and on said outer contour said stator support elements are arranged and fixed thereto.

For example it would be possible to weld said stator support elements onto said outer contour of said stator core.

In this case the stator support elements could be for example designed as elements having the solid or massive cross section.

However it is of advantage if the stator support elements are designed as hollow elements and in particular providing an additional flow guiding channel which is extending through said stator support elements.

Such a design allows to increase the flow cross section without increasing the diameter of the housing sleeve or to decrease the diameter of the housing sleeve by maintaining the flow cross section.

For example the stator support elements could be tube like or have any desired shape forming such an additional flow guiding channel.

One design which is of particular advantage provides that said stator support elements are U-shaped.

A design which is of specific advantage provides that said stator support elements comprise two foot sections fixed to the stator core and flange sections adjoining said foot sections and extending up to a bridging section arranged at a distance from an outer surface of said stator core.

In this case the stator support elements provide the additional flow guiding channel by having this additional flow guiding channel arranged between said bridging section and an area of the outer surface of the stator core covered by said bridging section as well as between said two flange sections.

In particular in such a design the foot sections are welded to said outer surface of said stator core.

In general it would be of advantage if the stator support elements are arranged about said axis of rotation at identical angular distance from each other in order to provide a symmetrical support of said stator core within said housing sleeve.

Further it is of particular advantage if there are more than two stator support elements provided.

For example it would be possible to provide at least three stator support elements on said stator.

One preferred solution provides four stator support elements on said stator core enabling a symmetrical support of said stator core within said housing sleeve.

With respect to said inner sleeve surface of said housing sleeve the machining for said inner sleeve surface is simplified if said inner sleeve surface is a cylindrical surface such a cylindrical surface have in general a variety of cross sections which need not necessarily circular.

However it is of specific advantage if said inner sleeve surface has a circular cross section because then insertion of said stator having a stator core with said stator support elements is simplified.

The present invention is not limited to a suction gas cooled motor, it applies also for example to a pressure gas cooled motor to any of the kind of gas cooled motor.

Further advantageous features of the present invention are disclosed in connection with the detailed specification of several embodiments of a compressor according to the present invention in the figures.

BRIEF DESCRIPTION OF THE DRAWINGS

FIG. 2 shows a cross sectional view along lines 2-2 in FIG. 1;

DETAILED DESCRIPTION OF THE INVENTION

Figure 1:
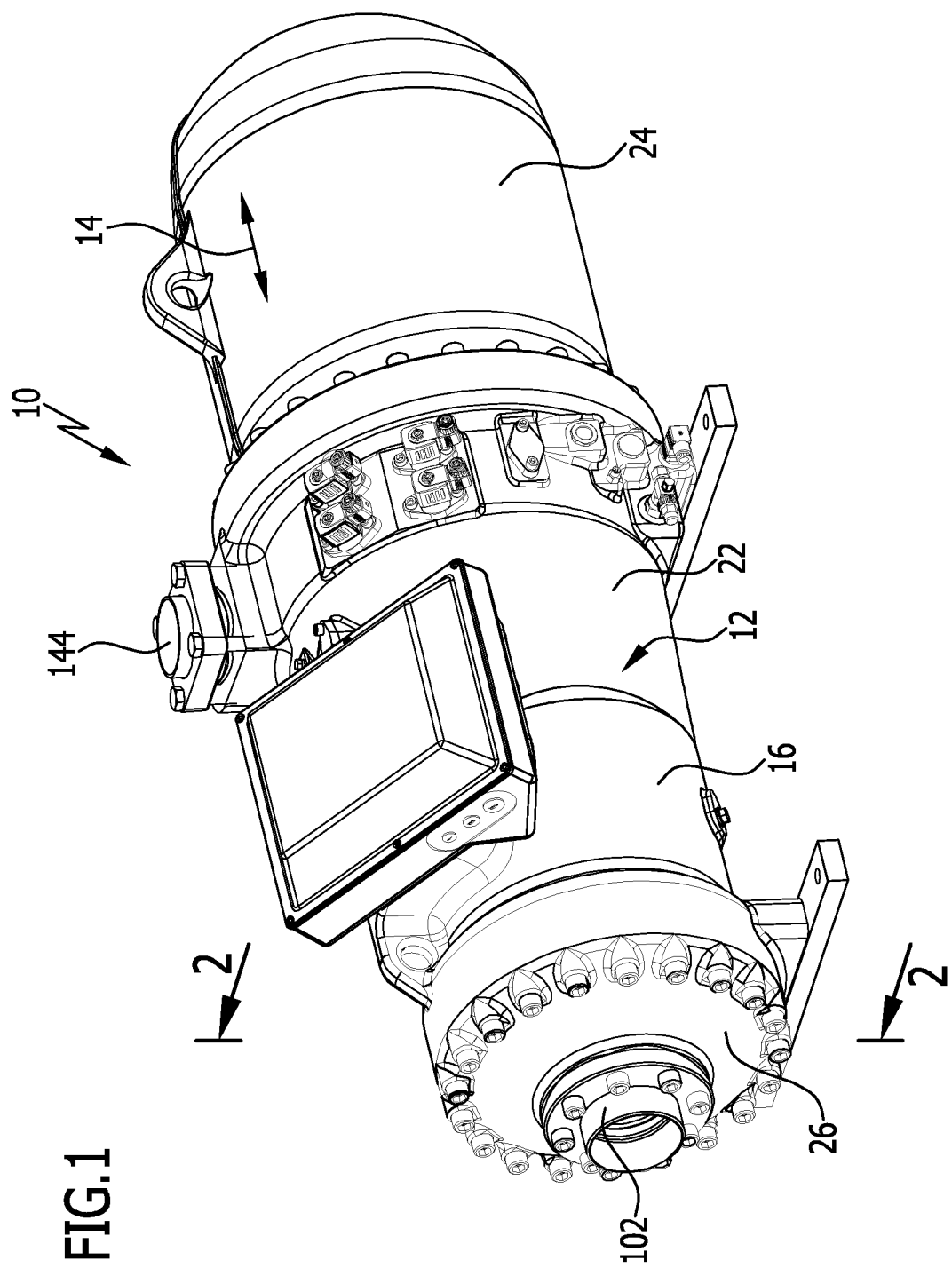
FIG. 1 shows a perspective view of a compressor for refrigerant.

A compressor 10 for refrigerant, as shown in FIG. 1, comprises a compressor housing 12 extending in a longitudinal direction 14, said compressor housing comprising a motor housing section 16 a compression section 22 and a high-pressure housing section 24 arranged in sequence in said longitudinal direction 14.

As shown, for example in FIGS. 1 and 2, motor housing section 16 is provided on its side opposite to said compression housing section 22 with a cover 26 releasable connected to a motor housing sleeve 28, surrounding a receptacle 32 within said motor housing section 16 receiving an electric motor 34.

Electric motor 34 itself comprises a stator 36 arranged in said receptacle 32 and supported by said housing sleeve 28 and fixed thereto, as well as a rotor 38 arranged to be surrounded by said stator 36.

Said rotor 38 is mounted on a compressor drive shaft 42 extending through said rotor 38 and from said rotor 38 extending to a compression unit 44 in order to drive one or more compression elements 46, for example a pair of screws. However the compression element 46 can also be a piston or a scroll or another kind of compression element.

Drive shaft 42 is preferably rotatably mounted about an axis of rotation 52 by a bearing system 54 arranged between said compression unit 44 and said electric motor 34 and comprising for example several roller bearings 56, 58 spaced apart from each other in said longitudinal direction 14 and held by a bearing sleeve 62 which is for example formed as an integral part of compressor housing 12.

In the particular embodiment drive shaft 42 with its rotor supporting section 72 is merely supported by bearing system 54 and its free end 74, arranged on a side of said rotor supporting section 72 opposite to said bearing system 54 is arranged free of support with respect to compressor housing 12.

Other solutions having additional bearings on the rotor supporting section 72 and/or on the free end 74 are also possible.

Figure 3:
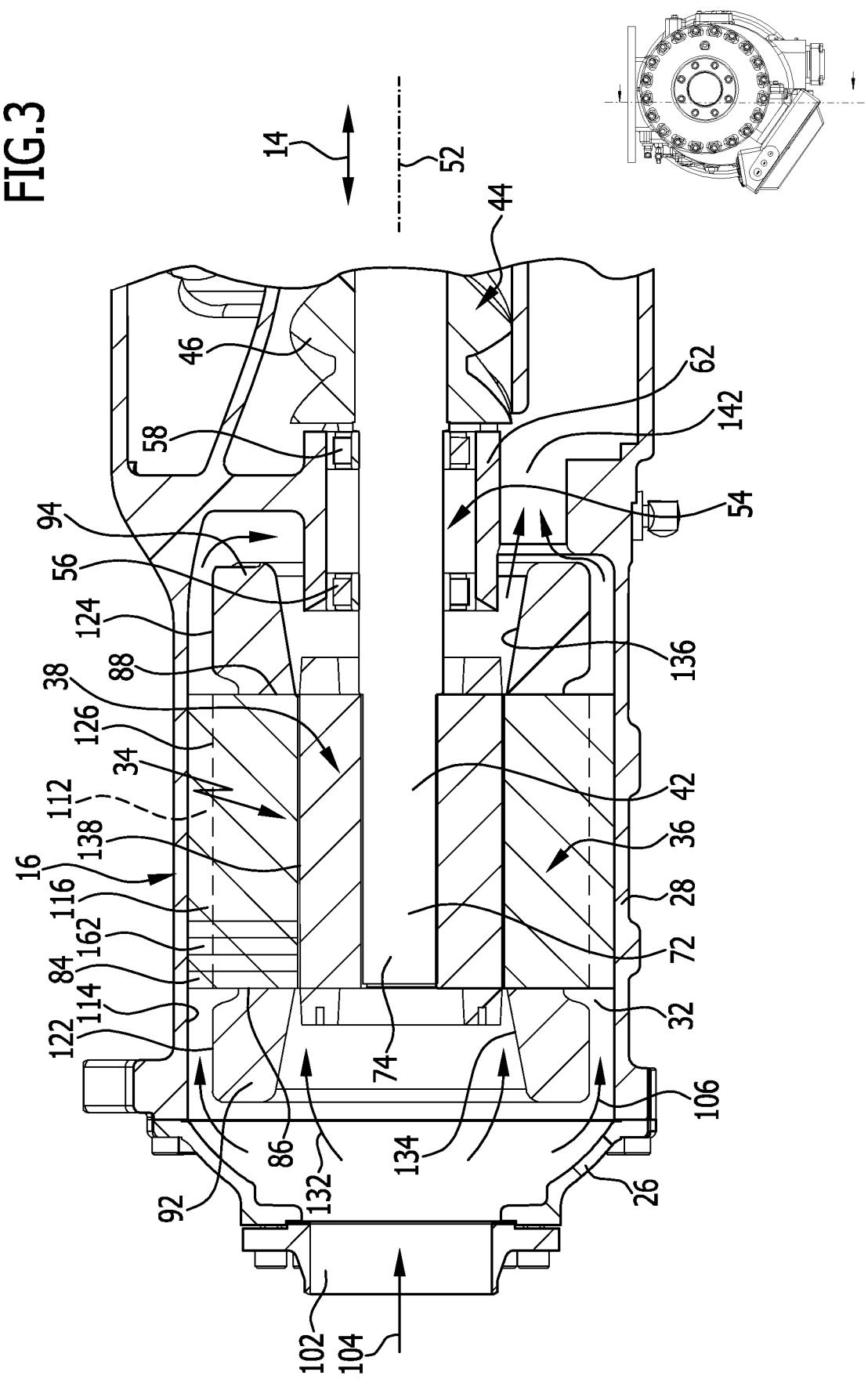
FIG. 3 shows a cross sectional view along lines 3-3 in FIG. 2.
Figure 4:
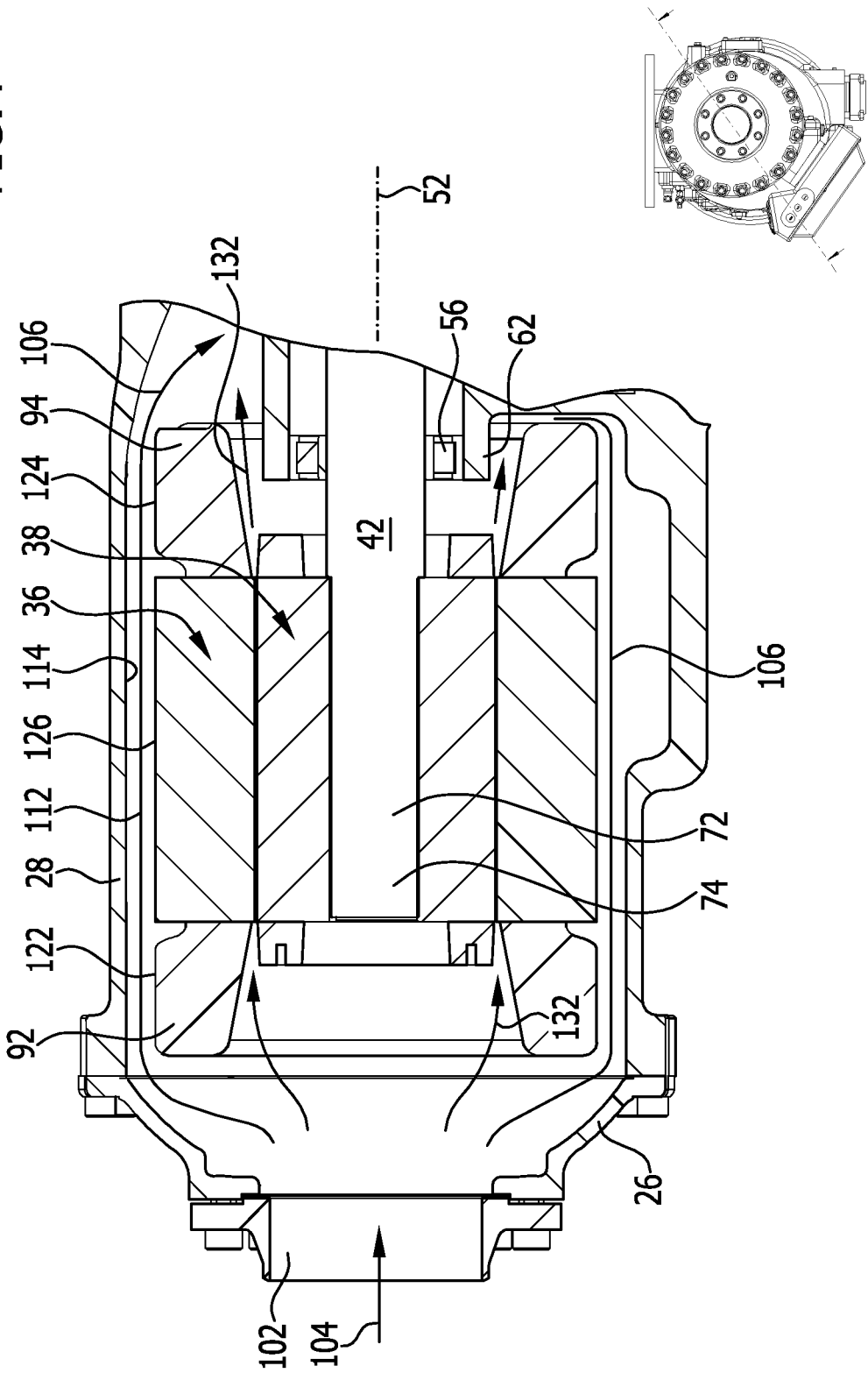
FIG. 4 shows a cross sectional view along lines 4-4 in FIG. 2.
Figure 5:
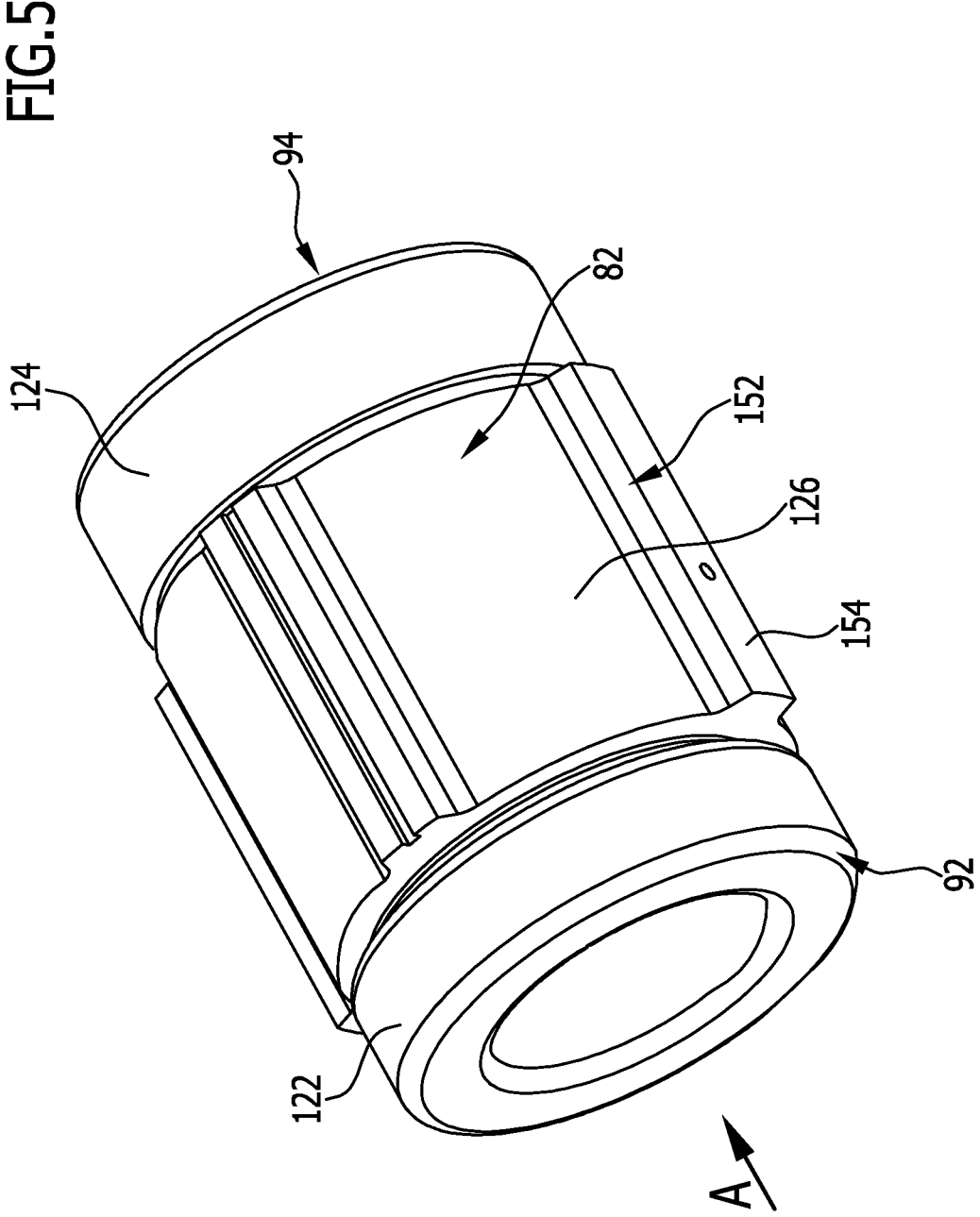
FIG. 5 shows a perspective view of a stator according to a first embodiment.

Stator 36 comprises, as for example shown in FIGS. 2 and 3 a stator core 82 made of a stack of laminations 84 stacked in a direction parallel to said axis of rotation 52, said stack extending from a first front side 86 of said rotor core 82 to a second front side 88 of said rotor core.

Stator core 82 is further provided with windings of electrical cores extending through said stator core 82 and forming end windings 92, 94, arranged outside said stator core 82 and in front of said front sides 86, 88.

In order to supply refrigerant to said compressor 10 compressor housing is provided with a suction inlet 102 arranged on cover 26 for supplying refrigerant to be compressed to said receptacle 32 of said electric motor 34 in order to cool said electric motor 34 by a flow of refrigerant 104 entering receptacle 32 through suction inlet 102 and forming an outer flow 106 flowing through a flow guiding channel 112 formed by an inner sleeve surface 114 of said housing sleeve 28 and an outer side 116 of said stator 36, said other side 116 being formed by outer surfaces 122 and 124 of said end windings 92, 94 which are directed towards said inner surface 114 of said housing sleeve 28 and between the end windings 92, 94 formed by an outer surface 126 of said stator core 82.

Preferably flow of refrigerant 104 does not only form an outer flow of refrigerant 106 but also an inner flow of refrigerant 132 flowing along an inner surface 134, 136 of the respective end winding 92, 94 and between the end windings 92, 94 through a gap 138 between stator 36 and rotor 38.

The outer flow 106 first cools end winding 92, which is directed towards cover 26 by flowing along its outer surface 122, then cools stator core 82 by flowing along its outer surface 126 and finally cools end winding 94 by flowing along its outer surface 124, which end winding 94 is directed towards compression unit 44.

Thereafter outer flow 106 enters a transition opening 142 through which outer flow 106 can leave receptacle 132 and enter into compression unit 44.

Preferably inner flow 132 first cools inner surface 134 of end winding 192, then extends through gap 138 and finally cools inner surface 136 of end winding 94 and thereafter leaves receptacle 32 through transition opening 142 for entering into compression unit 44.

Refrigerant compressed by said compression unit 44 exits housing 12 through pressure outlet 144.

As shown in FIGS. 2 to 5 stator core 82 is provided with a plurality of stator support elements 152 extending radially outward from stator core 82 beyond outer surface 126 of stator core 82 and forming support surfaces 154 which are arranged radially outward of outer surface 126 of stator core 82 and abutting on inner sleeve surface 114 of housing sleeve 28.

In particular inner sleeve surface 114 of stator sleeve 28 is a continuous surface cylindrical with respect to axis of rotation 52 and having a circular cross section.

For example support surfaces 154 of stator support elements 152 are machined in order to closely fit into inner sleeve surface 114 of housing sleeve 28 so as to precisely position rotor core 82 within stator sleeve 28.

In the first embodiment as shown in FIGS. 2 to 6 the outer surfaces 122 and 124 of end windings 92 and 94 are flush with the outer surface 126 of stator core 82 which means that they are in the same radial distance from the axis of rotation 52 in order to improve the cooling at the outer surfaces 122, 124 of end windings 92 and to further enable in particular to increase the radial distance of inner surfaces 134 and 136 of end windings 92 and 94 which provides an increased space around drive shaft 42 so that bearing system 54 with bearing sleeve 62 can be arranged as close as possible to stator 38 in order to reduce the length of rotor supporting section 72 of drive shaft 42 extending from bearing system 54, which then improves the precision with which rotor 38 rotates about axis of rotation 52.

In order to fix stator core 82 against rotation within housing sleeve 28 for example one of the stator support elements 152 can be provided with groove 156 which groove 156 can cooperate with a corresponding protrusion 158 or a corresponding tongue 158 arranged on housing sleeve 28.

Figure 7:
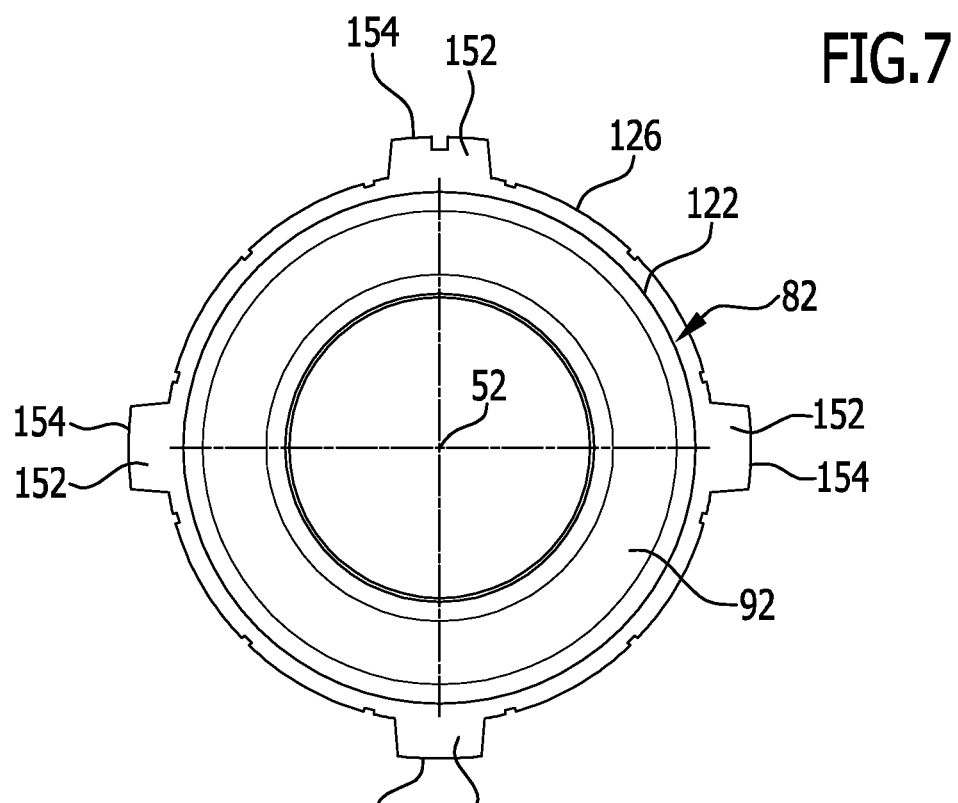
FIG. 7 shows a view similar to the one of FIG. 6 of a second embodiment according to the present invention.
Figure 6:
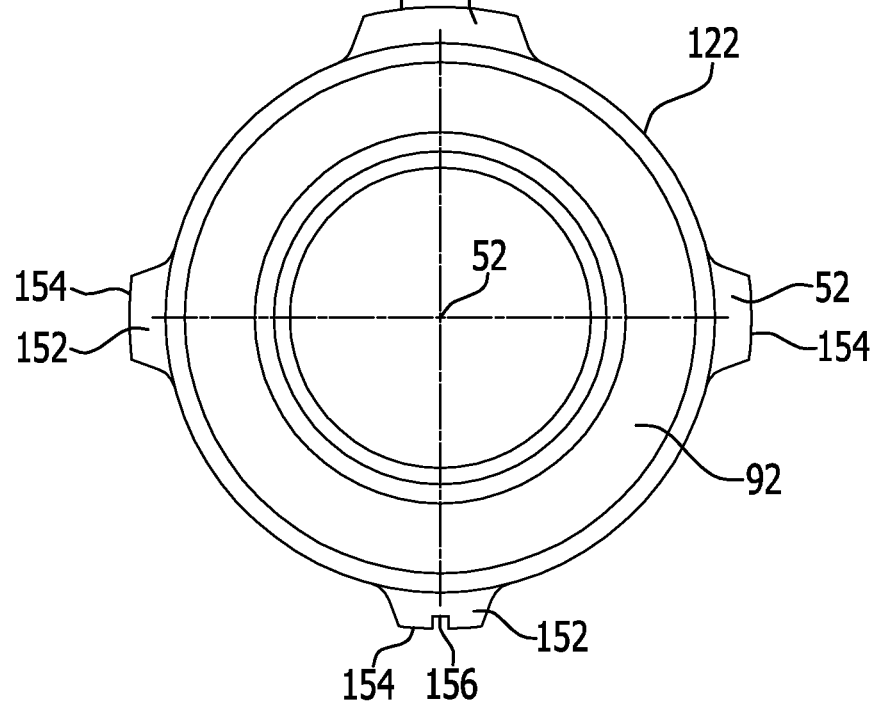
FIG. 6 shows a view in direction A in FIG. 5.

In a second embodiment, which is shown in FIG. 7, the outer surface 122 of end winding 92 is reduced with respect to its radial distance from axis of rotation 52 with respect to outer surface 126 of stator core 82.

As far as all other features of these second embodiments are concerned these features are provided with the same reference numerals so that with respect to the description thereof reference is made to the explanations provided in connection with the first embodiment.

The stator support elements 152 according to the first and second embodiments are obtained by protrusions of for example all laminations 84 used for forming the stator core 82 which protrusions 162, when being aligned with each other, form a continuous bead or ridge extending parallel to the axis of rotation 52 between the front sides 86 and 88 of stator core 82.

However the stator support elements 152 can be reduced in length by only providing part of the laminations 84 with protrusions 62 or—for example—by providing a first number and a last number of laminations 84 with protrusions 162 so that the laminations 84 between the first number and the second number have no protrusions 162.

Preferably protrusions 162 are formed integral with or as one piece with the respective laminations 84 so that in the course of the process of manufacturing laminations 84 protrusions 162 are formed in the course of the same forming process as used for forming laminations 84.

Preferably laminations 84 are provided with four protrusions 162 arranged at the same angular distance with respect to each other around axis of rotation 52 so that these protrusions 162 can be manufactured with more or less no loss of the sheet of band material from which laminations 84 are manufactured, for example either by punching or cutting.

In a third embodiment all elements which are identical with the first and second embodiment are provided with the same reference numerals so that reference can be made thereto.

According to the third embodiment stator support elements 152' are not integral with stator core 82 but are made by formed metal sheet elements 172, having two foot sections 174, 176 which for example are welded on stator core 82, in particular onto outer surface 126 of stator core 82, and from each foot section 174, 176 a flange section 184, 186 is extending away from the outer surface 126 of stator core 82 towards a bridging section 188 connecting flange sections 184, 186 at its ends opposite to said foot sections 174, 176 and having a curved shape so that in particular the bridging section 188 extends at a constant distance from outer surface 126 of rotor core 82 and forms a support surface 154' adapted to abut on the inner sleeve surface 114 of housing sleeve 28 with the same curvature with respect to axis of rotation 52 as the inner sleeve surface 114 of housing sleeve 28.

Figure 8:
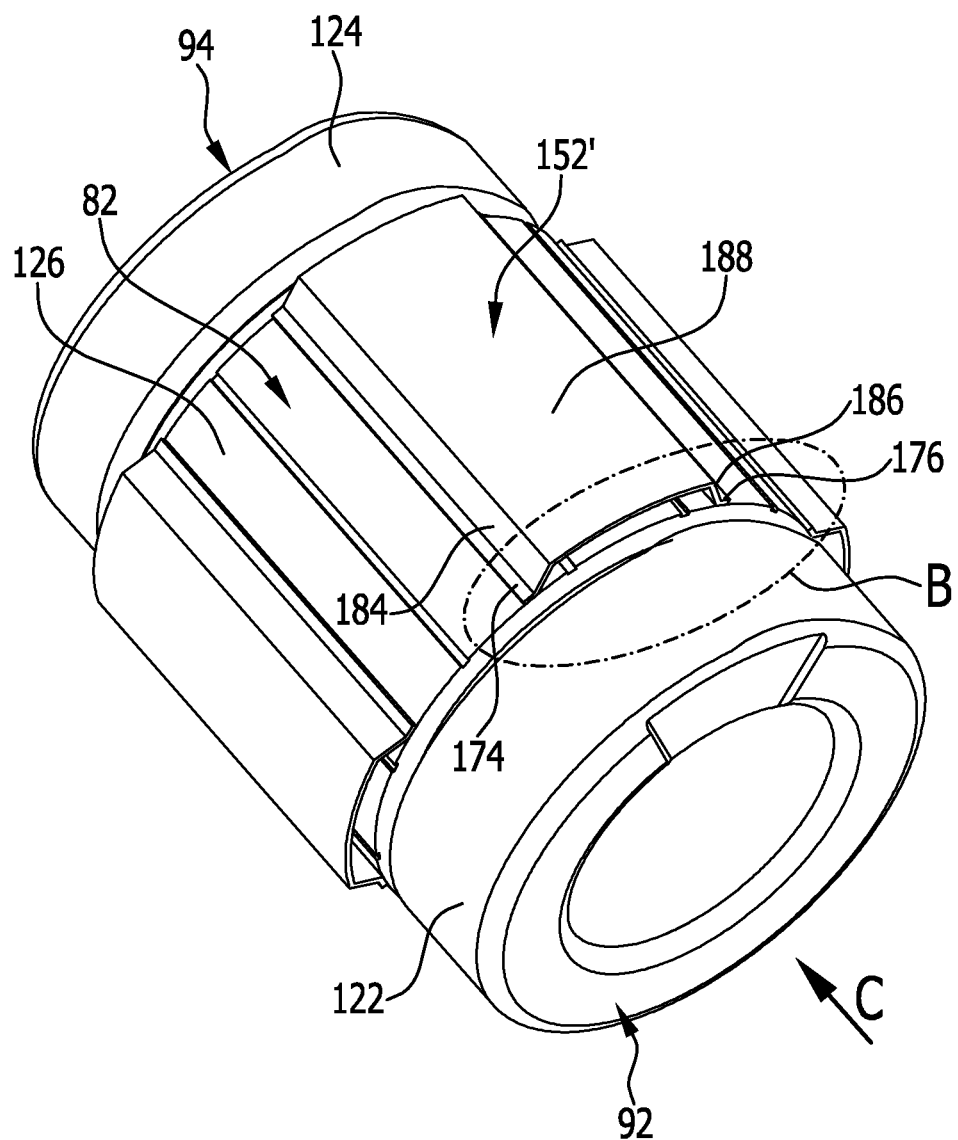
FIG. 8 shows a perspective view of a stator according to a third embodiment according to the present invention.
Figure 10:
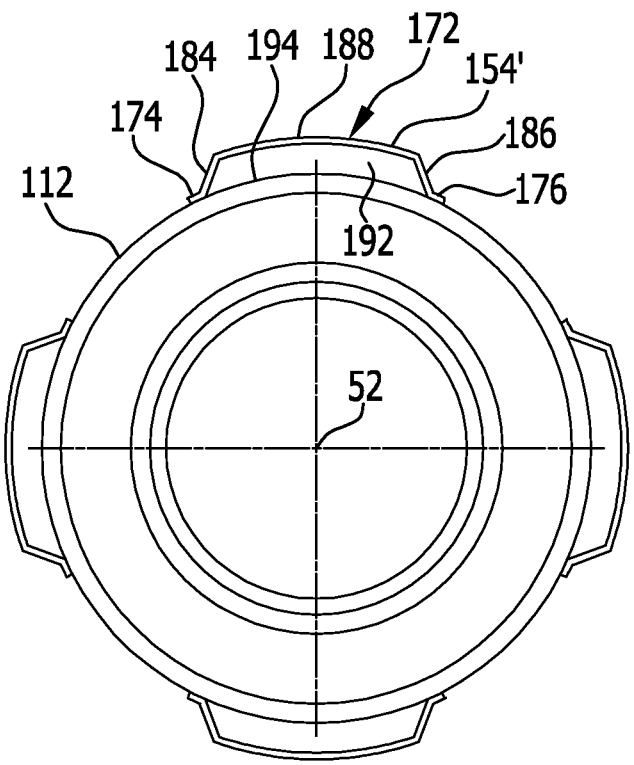
FIG. 10 shows a front view along arrow C in FIG. 8.
Figure 9:
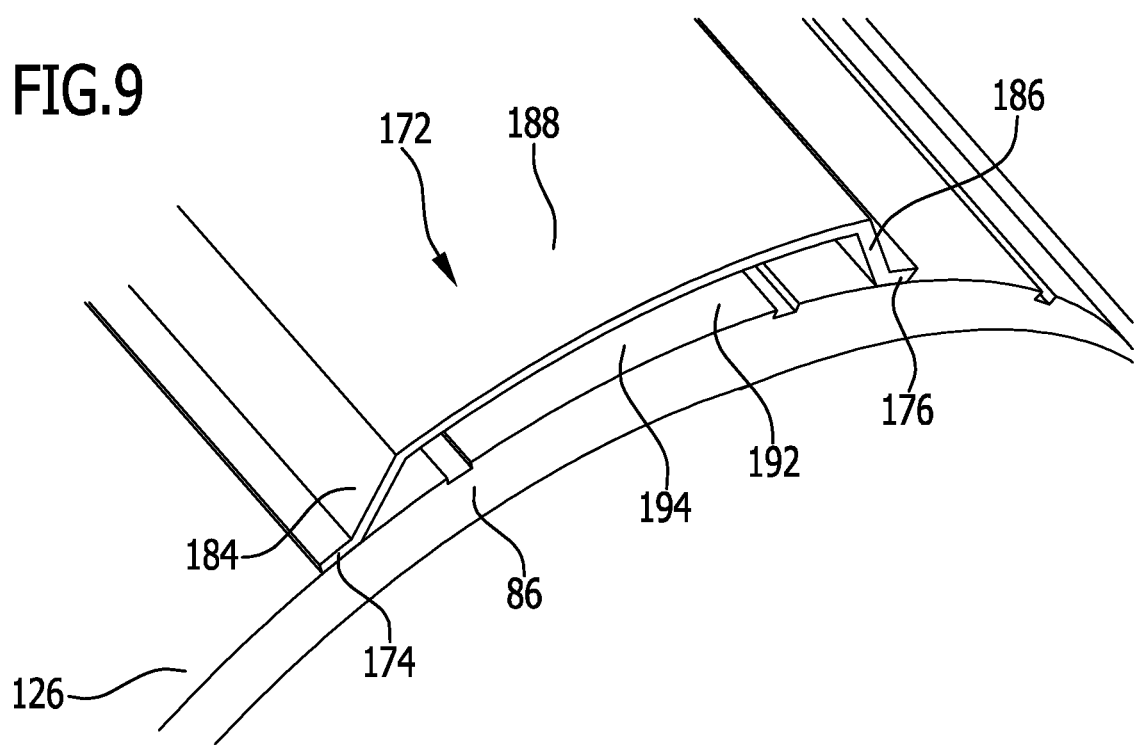
FIG. 9 shows an enlarged view of area B in FIG. 8.

According to the embodiment shown in FIGS. 8 to 9 the stator support elements 152' are arranged at the same angular distances with respect to axis of rotation 52 on outer surface 126 of stator core 82.

Due to the fact that bridging section 188 extends at a distance from outer surface 126 of stator core 82 the stator support elements 152' by themselves form a further flow guiding channel 192 extending between bridging section 188 and an area 194 of outer surface 126 covered by bridging section 188 and further between flange sections 184, 186 so that in addition to the flow guiding channels 112, formed between stator support elements 152', flow guiding channel 192 provides improved cooling of stator core 82 in the area of the stator support elements 152'.

According to the third embodiment stator support elements 152' are extending parallel to axis of rotation 52 between front side 86 and front side 88 of stator core 82 but can be also reduced with respect to their longitudinal extension if they provide sufficient stability for positioning of rotor core 82 within housing sleeve 28.

In addition stator support elements 152' due to the fact that bridging section 188 extends in a radial distance from the surface area 194 covered by bridging section 188 enables to provide the stator support elements 152' with certain radial elasticity so that support surfaces 154' can be moved at a certain elasticity with respect to stator core 82 in order to obtain a force locking connection between stator support elements 152' and housing sleeve 28.

Figure 11:
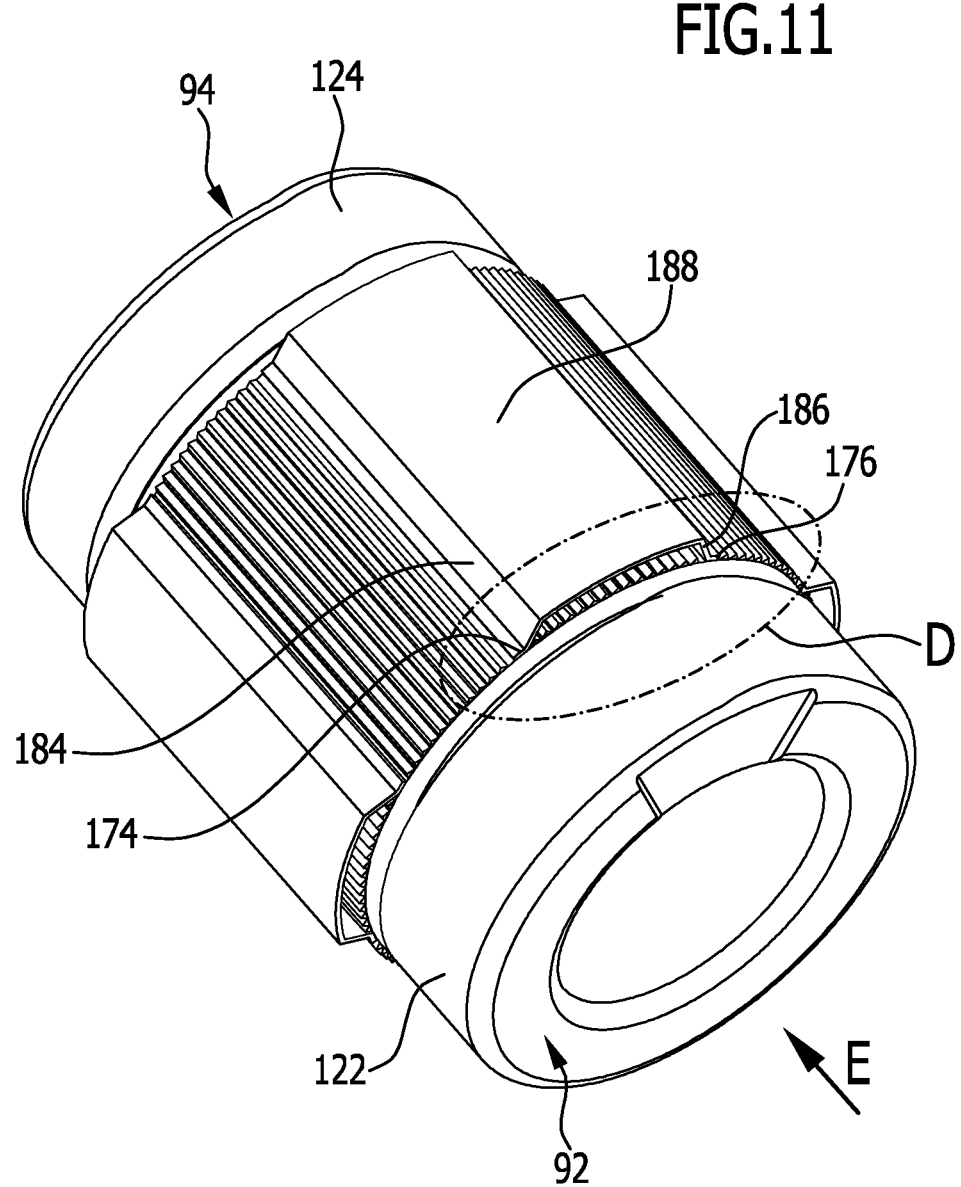
FIG. 11 shows a perspective view of a fourth embodiment according to the present invention.
Figure 13:
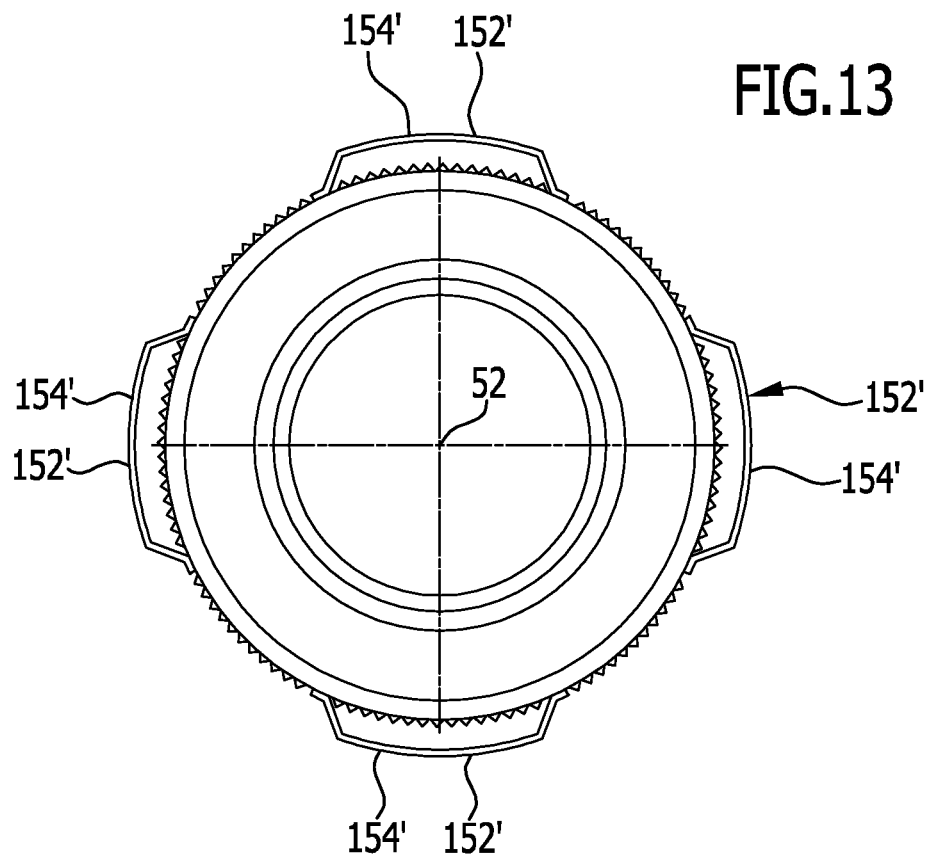
FIG. 13 shows a front view along arrow E in FIG. 11.
Figure 12:
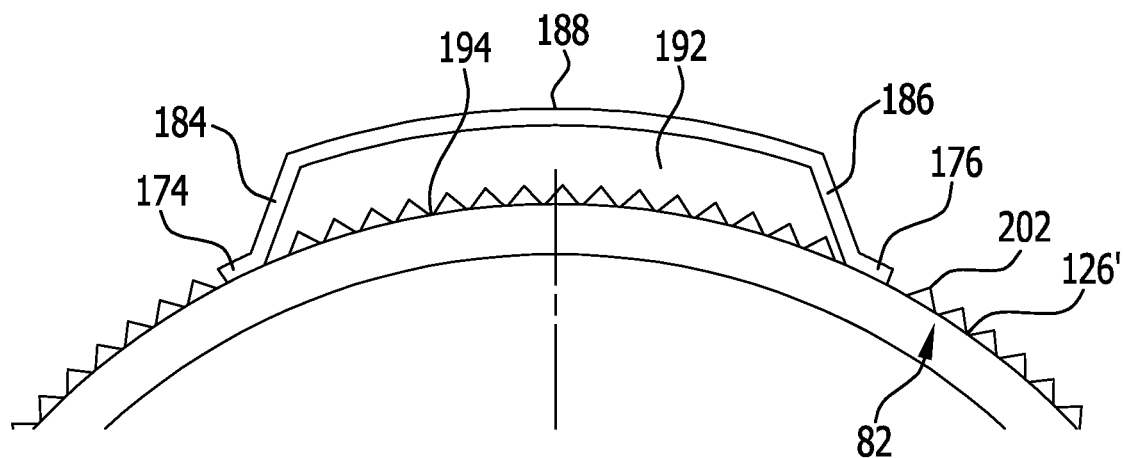
FIG. 12 shows an enlarged view of area D in FIG. 11.

According to a fourth embodiment shown in FIGS. 11 to 13 rotor core 82 is not provided with an even cylindrical outer surface 126 but outer surface 126 of stator core 128 is provided with longitudinal ribs 202 extending parallel to axis of rotation 52 in order to increase the surface for heat exchange between the outer flow 106 in flow guiding channels 112 and flow guiding channels 192.

The longitudinal ribs 102 are preferably obtained by protrusions integral with the laminations 84 which protrusions when stacking laminations 84 form longitudinal ribs 202 extending preferably parallel to axis of rotation 52.

The invention claimed is:

1. Compressor for refrigerant having a compressor housing, said compressor housing being provided with a suction inlet and a pressure outlet, said compressor comprising a compression unit, arranged in a compression housing section of said compressor housing and an electric motor arranged in a motor housing section of said compressor housing, said electric motor comprising a stator arranged within a stator receiving sleeve of said motor housing section and a rotor surrounded by said stator and arranged on a drive shaft of said electric motor for rotation about an axis of rotation together with said drive shaft, said stator comprising a stator core having a stack of laminations and extending parallel to said axis of rotation from a first front side to a second front side, said stator having windings extending through said stator core and forming end windings arranged in front of said front sides, and a channel for guiding at least a portion of said refrigerant entering through said suction inlet along an outer side of said stator before entering said compression unit, wherein the stator core is provided with at least two stator support elements fixed to said stator core and extending in radial direction of said axis of rotation beyond an outer surface of said stator core for support of said stator on an inner sleeve surface of said stator receiving sleeve without a weld therebetween, said at least two stator support elements together with said inner sleeve surface and said outer surface of said stator core forming the channel for guiding at least a portion of said refrigerant; and wherein said outer side of said stator is provided by outer surfaces of said end windings of said stator and an outer surface of said stator extending between said end windings of said stator; and wherein the stator core is rotationally fixed to the stator receiving sleeve at a predetermined angular orientation; and wherein said channel is one of a plurality of flow guiding channels that extend along said stator support elements of said electric motor, wherein said stator support elements are fixed onto said stator core as separate elements.

2. Compressor for refrigerant having a compressor housing, said compressor housing being provided with a suction inlet and a pressure outlet, said compressor comprising a compression unit, arranged in a compression housing section of said compressor housing and an electric motor arranged in a motor housing section of said compressor housing, said electric motor comprising a stator arranged within a stator receiving sleeve of said motor housing section and a rotor surrounded by said stator and arranged on a drive shaft of said electric motor for rotation about an axis of rotation together with said drive shaft, said stator comprising a stator core having a stack of laminations and extending parallel to said axis of rotation from a first front side to a second front side, said stator having windings extending through said stator core and forming end windings arranged in front of said front sides, and a channel for guiding at least a portion of said refrigerant entering through said suction inlet along an outer side of said stator before entering said compression unit, wherein the stator core is provided with at least two stator support elements fixed to said stator core and extending in radial direction of said axis of rotation beyond an outer surface of said stator core for support of said stator on an inner sleeve surface of said stator receiving sleeve without a weld therebetween, said at least two stator support elements together with said inner sleeve surface and said outer surface of said stator core forming the channel for guiding at least a portion of said refrigerant; and wherein said outer side of said stator is provided by outer surfaces of said end windings of said stator and an outer surface of said stator extending between said end windings of said stator; and wherein the stator core is rotationally fixed to the stator receiving sleeve at a predetermined angular orientation; and wherein said channel is one of a plurality of flow guiding channels that extend along said stator support elements of said electric motor, and wherein said stator support elements are arranged and fixed on an outer contour of said stator core, and said stator support elements are welded on said outer contour of said stator core.

3. Compressor for refrigerant having a compressor housing, said compressor housing being provided with a suction inlet and a pressure outlet, said compressor comprising a compression unit, arranged in a compression housing section of said compressor housing and an electric motor arranged in a motor housing section of said compressor housing, said electric motor comprising a stator arranged within a stator receiving sleeve of said motor housing section and a rotor surrounded by said stator and arranged on a drive shaft of said electric motor for rotation about an axis of rotation together with said drive shaft, said stator comprising a stator core having a stack of laminations and extending parallel to said axis of rotation from a first front side to a second front side, said stator having windings extending through said stator core and forming end windings arranged in front of said front sides, and a channel for guiding at least a portion of said refrigerant entering through said suction inlet along an outer side of said stator before entering said compression unit, wherein the stator core is provided with at least two stator support elements fixed to said stator core and extending in radial direction of said axis of rotation beyond an outer surface of said stator core for support of said stator on an inner sleeve surface of said stator receiving sleeve, wherein said stator support elements are fixed onto said stator core as separate elements wherein said stator support elements are hollow elements.

4. Compressor in accordance with claim 3, wherein said stator support elements provide an additional flow guiding channel extending through said stator support elements.

5. Compressor in accordance with claim 3, wherein said stator support elements are U-shaped.

6. Compressor in accordance with claim 3, said stator support elements comprise two foot sections fixed to the stator core and flange sections adjoining said foot sections and extending up to a bridging section arranged at a distance from the outer surface of said stator core.

7. Compressor for refrigerant having a compressor housing, said compressor housing being provided with a suction inlet and a pressure outlet, said compressor comprising a compression unit, arranged in a compression housing section of said compressor housing and an electric motor arranged in a motor housing section of said compressor housing, said electric motor comprising a stator arranged within a stator receiving sleeve of said motor housing section and a rotor surrounded by said stator and arranged on a drive shaft of said electric motor for rotation about an axis of rotation together with said drive shaft, said stator comprising a stator core having a stack of laminations and extending parallel to said axis of rotation from a first front side to a second front side, said stator having windings extending through said stator core and forming end windings arranged in front of said front sides, and a channel for guiding at least a portion of said refrigerant entering through said suction inlet along an outer side of said stator before entering said compression unit, wherein the stator core is provided with at least two stator support elements fixed to said stator core and extending in radial direction of said axis of rotation beyond an outer surface of said stator core for support of said stator on an inner sleeve surface of said stator receiving sleeve via a tongue and a groove, said at least two stator support elements together with said inner sleeve surface and said outer surface of said stator core forming the channel for guiding at least a portion of said refrigerant to provide an outer flow of refrigerant; and further comprising a gap between the stator and the rotor for providing an inner flow of refrigerant flow along an inner surface of the end windings; and wherein the stator core is rotationally fixed to the stator receiving sleeve at a predetermined angular orientation; and wherein said channel is one of a plurality of flow guiding channels that extend along said stator support elements of said electric motor.

8. Compressor in accordance with claim 7, wherein the at least two stator support elements are fixed to said stator core by being integrally manufactured as one piece with laminations forming said stator core.

9. Compressor in accordance with claim 7, wherein each of the flow guiding channels define a channel depth radially between said inner sleeve surface and said outer surface of said stator core, wherein the channel depth remains substantially constant over a circumferential span for each of the flow guiding channels as between respective pairs of the least two stator support elements.

10. Compressor for refrigerant having a compressor housing, said compressor housing being provided with a suction inlet and a pressure outlet, said compressor comprising a compression unit, arranged in a compression housing section of said compressor housing and an electric motor arranged in a motor housing section of said compressor housing, said electric motor comprising a stator arranged within a stator receiving sleeve of said motor housing section and a rotor surrounded by said stator and arranged on a drive shaft of said electric motor for rotation about an axis of rotation together with said drive shaft, said stator comprising a stator core having a stack of laminations and extending parallel to said axis of rotation from a first front side to a second front side, said stator having windings extending through said stator core and forming end windings arranged in front of said front sides, and a channel for guiding at least a portion of said refrigerant entering through said suction inlet along an outer side of said stator before entering said compression unit, wherein the stator core is provided with at least two stator support elements fixed to said stator core and extending in radial direction of said axis of rotation beyond an outer surface of said stator core for support of said stator on an inner sleeve surface of said stator receiving sleeve without a weld therebetween, said at least two stator support elements together with said inner sleeve surface and said outer surface of said stator core forming the channel for guiding at least a portion of said refrigerant; and wherein said outer side of said stator is provided by outer surfaces of said end windings of said stator and an outer surface of said stator extending between said end windings of said stator; and wherein the stator core is rotationally fixed to the stator receiving sleeve at a predetermined angular orientation;
and wherein said channel is one of a plurality of flow guiding channels that extend along said stator support elements of said electric motor, and
further comprising radial contact abutment at an interface between one of the stator support elements and the stator receiving sleeve to provide for the predetermined angular orientation, wherein the radial contact abutment comprises a tongue and a groove, with the groove receiving the tongue, with the tongue and the groove being at the interface.

11. Compressor for refrigerant having a compressor housing, said compressor housing being provided with a suction inlet and a pressure outlet, said compressor comprising a compression unit, arranged in a compression housing section of said compressor housing and an electric motor arranged in a motor housing section of said compressor housing, said electric motor comprising a stator arranged within a stator receiving sleeve of said motor housing section and a rotor surrounded by said stator and arranged on a drive shaft of said electric motor for rotation about an axis of rotation together with said drive shaft, said stator comprising a stator core having a stack of laminations and extending parallel to said axis of rotation from a first front side to a second front side, said stator having windings extending through said stator core and forming end windings arranged in front of said front sides, and a channel for guiding at least a portion of said refrigerant entering through said suction inlet along an outer side of said stator before entering said compression unit, wherein the stator core is provided with at least two stator support elements integrally manufactured as one piece with laminations forming said stator core and extending in radial direction of said axis of rotation beyond an outer surface of said stator core for support of said stator on an inner sleeve surface of said stator receiving sleeve without a weld therebetween, said at least two stator support elements together with said inner sleeve surface and said outer surface of said stator core forming the channel for guiding at least a portion of said refrigerant; and wherein said stator receiving sleeve comprises a constant wall thickness for supporting the stator, and wherein the constant wall thickness extends circumferentially over the protrusions and over the channel: and wherein said channel is one of a plurality of flow guiding channels that extend along said stator support elements of said electric motor, further comprising a tongue and a groove for rotationally fixing the stator support element with the stator sleeve with the groove receiving the tongue, with the tongue and the groove being provided at an interface between the one of the stator support elements and the stator receiving sleeve.

12. Compressor in accordance with claim 11, wherein each of the flow guiding channels define a channel depth radially between said inner sleeve surface and said outer surface of said stator core, wherein the channel depth remains substantially constant over a circumferential span for each of the flow guiding channels as between respective pairs of the least two stator support elements.

13. Compressor for refrigerant having a compressor housing, said compressor housing being provided with a suction inlet and a pressure outlet, said compressor comprising a compression unit, arranged in a compression housing section of said compressor housing and an electric motor arranged in a motor housing section of said compressor housing, said electric motor comprising a stator arranged within a stator receiving sleeve of said motor housing section and a rotor surrounded by said stator and arranged on a drive shaft of said electric motor for rotation about an axis of rotation together with said drive shaft, said stator comprising a stator core having a stack of laminations and extending parallel to said axis of rotation from a first front side to a second front side, said stator having windings extending through said stator core and foiming end windings arranged in front of said front sides, and a channel for guiding at least a portion of said refrigerant entering through said suction inlet along an outer side of said stator before entering said compression unit, wherein the stator core is provided with at least two stator support elements integrally manufactured as one piece with laminations forming said stator core and extending in radial direction of said axis of rotation beyond an outer surface of said stator core for support of said stator on an inner sleeve surface of said stator receiving sleeve, said at least two stator support elements together with said inner sleeve surface and said outer surface of said stator core forming the channel for guiding at least a portion of said refrigerant; and wherein an angular span of the channel for guiding at least a portion of said refrigerant is greater than a radially outermost angular span of any individual one of the at least two stator support elements; and wherein said channel is one of a plurality of flow guiding channels that extend along said stator support elements of said electric motor, and wherein said stator is supported on an inner sleeve surface of said stator receiving sleeve via a tongue and groove.

* * * * *

UNITED STATES PATENT AND TRADEMARK OFFICE
CERTIFICATE OF CORRECTION

PATENT NO. : 11,277,044 B2
APPLICATION NO. : 15/902374
DATED : March 15, 2022
INVENTOR(S) : Franck Repentin Page 1 of 1

It is certified that error appears in the above-identified patent and that said Letters Patent is hereby corrected as shown below:

In the Claims

Column 12, Claim 13, Line 15, currently reads "extending through said stator core and foiming end windings" and should correctly read --extending through said stator core and forming end windings--

Signed and Sealed this
Tenth Day of May, 2022

Katherine Kelly Vidal
*Director of the United States Patent and Trademark Office*